US011964475B2

(12) United States Patent
Hirama

(10) Patent No.: US 11,964,475 B2
(45) Date of Patent: Apr. 23, 2024

(54) THERMAL PRINTER

(71) Applicant: Seiko Instruments Inc., Chiba (JP)

(72) Inventor: Toshihiro Hirama, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 91 days.

(21) Appl. No.: 17/730,609

(22) Filed: Apr. 27, 2022

(65) Prior Publication Data

US 2022/0355599 A1 Nov. 10, 2022

(30) Foreign Application Priority Data

May 10, 2021 (JP) ................................ 2021-079465

(51) Int. Cl.
*B41J 15/04* (2006.01)
*B41J 11/70* (2006.01)

(52) U.S. Cl.
CPC ............... *B41J 15/04* (2013.01); *B41J 11/70* (2013.01)

(58) Field of Classification Search
CPC ........ B41J 15/04; B41J 15/042; B41J 3/4075; B41J 2/32; B41J 11/70; B41J 11/703; B41J 13/00; B41J 13/0009; B41J 15/00; B41J 15/044; B41J 15/046
See application file for complete search history.

(56) References Cited

U.S. PATENT DOCUMENTS

2018/0272765 A1 9/2018 Iwamoto
2022/0281243 A1* 9/2022 Ooi ........................ B41J 15/042

FOREIGN PATENT DOCUMENTS

| | | | | |
|---|---|---|---|---|
| EP | 0908318 A2 | | 4/1999 | |
| EP | 0908318 A3 | | 8/1999 | |
| JP | 2011-131569 A | | 7/2011 | |
| JP | 2018111317 A | * | 7/2018 | .............. B41J 11/70 |
| JP | 6845863 B2 | * | 3/2021 | .............. B41J 11/04 |

OTHER PUBLICATIONS

Extended European Search Report in Europe Application No. 22170966.0, dated Oct. 5, 2022, 7 pages.

* cited by examiner

*Primary Examiner* — Kristal Feggins
(74) *Attorney, Agent, or Firm* — Crowell & Moring LLP

(57) ABSTRACT

A thermal printer includes: a roll sheet receiving portion; and a delivery slot through which a portion of the recording sheet drawn from the roll sheet is delivered to an outside of the thermal printer; a printing unit including: a thermal head; and a platen roller configured to convey the recording sheet toward the delivery slot while sandwiching the recording sheet between the thermal head and the platen roller; a flap provided on a portion of the casing between the printing unit and the roll sheet receiving portion so as to be pivotable about a first axis, and configured to press the roll sheet in a direction of separating away from the delivery slot through abutment against an outer peripheral surface of the roll sheet; and an urging member configured to urge the flap about the first axis in the direction of separating away from the delivery slot.

7 Claims, 10 Drawing Sheets

THERMAL PRINTER

RELATED APPLICATIONS

This application claims priority to Japanese Patent Application No. 2021-079465, filed on May 10, 2021, the entire content of which is incorporated herein by reference.

BACKGROUND OF THE INVENTION

1. Field of the Invention

The present invention relates to a thermal printer.

2. Description of the Related Art

In a thermal printer, under a state in which a recording sheet is sandwiched between a platen roller and a thermal head, the platen roller is rotated, and thus printing is performed by the thermal head on a print surface of the recording sheet while the recording sheet is conveyed. In the thermal printer, the recording sheet in a form of a roll sheet, which is obtained by winding the recording sheet around a core material, is received in a roll sheet receiving portion formed in a casing. For example, in the related-art thermal printer, a roll sheet is rotatably retained in the roll sheet receiving portion by a support shaft passing through the core material.

Incidentally, in order to reduce environmental loads and improve convenience, for labels such as POS labels on food and various display labels, a so-called linerless label is used as a recording sheet in some cases. The linerless label is a recording sheet without a liner configured to cover a pressure-sensitive adhesive layer formed on a surface opposite to a print surface of the recording sheet. When the recording sheet formed of the linerless label is used as a roll sheet, the pressure-sensitive adhesive layer of the recording sheet located on an outer peripheral side is wound under a state of adhering to the print surface of the recording sheet located on an inner peripheral side. Accordingly, when the linerless label is used as the recording sheet, as compared to a recording sheet without the pressure-sensitive adhesive layer, a larger pulling force is applied to the recording sheet at the time of conveyance of the recording sheet. Thus, it has been difficult to stably retain the roll sheet in the roll sheet receiving portion.

Meanwhile, in the related art, for example, at the time of replacement of the roll sheet, it is required that the support shaft be detached from and inserted into the roll sheet when the roll sheet is removed from and loaded into the roll sheet receiving portion. Accordingly, there has been a problem in that, for example, replacement work of the roll sheet is complicated.

In view of the above, in this technical field, there has been a demand for a thermal printer which allows a roll sheet to be easily removed from and loaded into a roll sheet receiving portion, and is also capable of stably retaining the roll sheet in the roll sheet receiving portion.

SUMMARY OF THE INVENTION

According to one embodiment of the present invention, there is provided a thermal printer including a casing including a roll sheet receiving portion that allows a roll sheet, which is obtained by winding a recording sheet, to be loaded into the roll sheet receiving portion; and a delivery slot through which a portion of the recording sheet drawn from the roll sheet is delivered to an outside of the thermal printer; a printing unit including: a thermal head provided in a space of the casing between the roll sheet receiving portion and the delivery slot, and configured to perform printing on the recording sheet; and a platen roller configured to convey the recording sheet toward the delivery slot while sandwiching the recording sheet between the thermal head and the platen roller; a flap provided on a portion of the casing between the printing unit and the roll sheet receiving portion so as to be pivotable about a first axis, and configured to press the roll sheet in a direction of separating away from the delivery slot through abutment against an outer peripheral surface of the roll sheet; and an urging member configured to urge the flap about the first axis in the direction of separating away from the delivery slot.

In the above-mentioned thermal printer according to the one embodiment of the present invention, wherein the thermal printer further includes a flap roller provided at a distal end portion of the flap, and configured so as to be rotatable about a second axis along a center axis of the roll sheet, and allowed to be brought into abutment against the recording sheet.

In the above-mentioned thermal printer according to the one embodiment of the present invention, wherein the thermal printer further includes a first guide roller and a second guide roller provided on a portion of the casing located closer to the roll sheet receiving portion than the printing unit, the first guide roller being rotatable about a third axis along the center axis of the roll sheet, the second guide roller being rotatable about a fourth axis along the third axis, and wherein the recording sheet is led to the printing unit through a space between the first guide roller and the second guide roller.

In the above-mentioned thermal printer according to the one embodiment of the present invention, wherein the first guide roller is arranged closer to the roll sheet receiving portion than the second guide roller, and wherein the first guide roller is made of a material softer than a material for the second guide roller.

In the above-mentioned thermal printer according to the one embodiment of the present invention, wherein the thermal printer further includes a sensor provided on the casing, and configured to detect a remaining amount of the roll sheet, wherein the sensor includes a lever that is connected to the flap, and is pivotable between an ON position and an OFF position along with pivoting of the flap.

In the above-mentioned thermal printer according to the one embodiment of the present invention, wherein the thermal printer further includes a positioning mechanism provided on the casing so as to be movable in a first direction along the center axis of the roll sheet, and configured to position the roll sheet in the roll sheet receiving portion in the first direction through abutment against the roll sheet from both sides in the first direction.

In the above-mentioned thermal printer according to the one embodiment of the present invention, wherein the printing unit includes: a fixed blade provided on one side with respect to the delivery slot; and a movable blade that is provided on another side with respect to the delivery slot so as to be allowed to come close to and separate away from the fixed blade, and is capable of cutting the recording sheet between the fixed blade and the movable blade, and wherein, in a center portion of the movable blade in the first direction, a recessed portion is formed to be recessed from a blade edge of the movable blade.

DETAILED DESCRIPTION OF THE PREFERRED EMBODIMENTS

Now, with reference to the drawings, an embodiment of the present invention is described. In the embodiment and modification examples described below, corresponding configurations are denoted by the same reference symbols, and description thereof is omitted in some cases. In the following description, expressions such as “parallel”, “orthogonal”, “center”, and “coaxial”, which express relative or absolute arrangement, not only represent such arrangement in the strict sense of the word, but also represent a relatively displaced state with an angle or a distance that falls within tolerance or achieves the same function.

Figure 1:
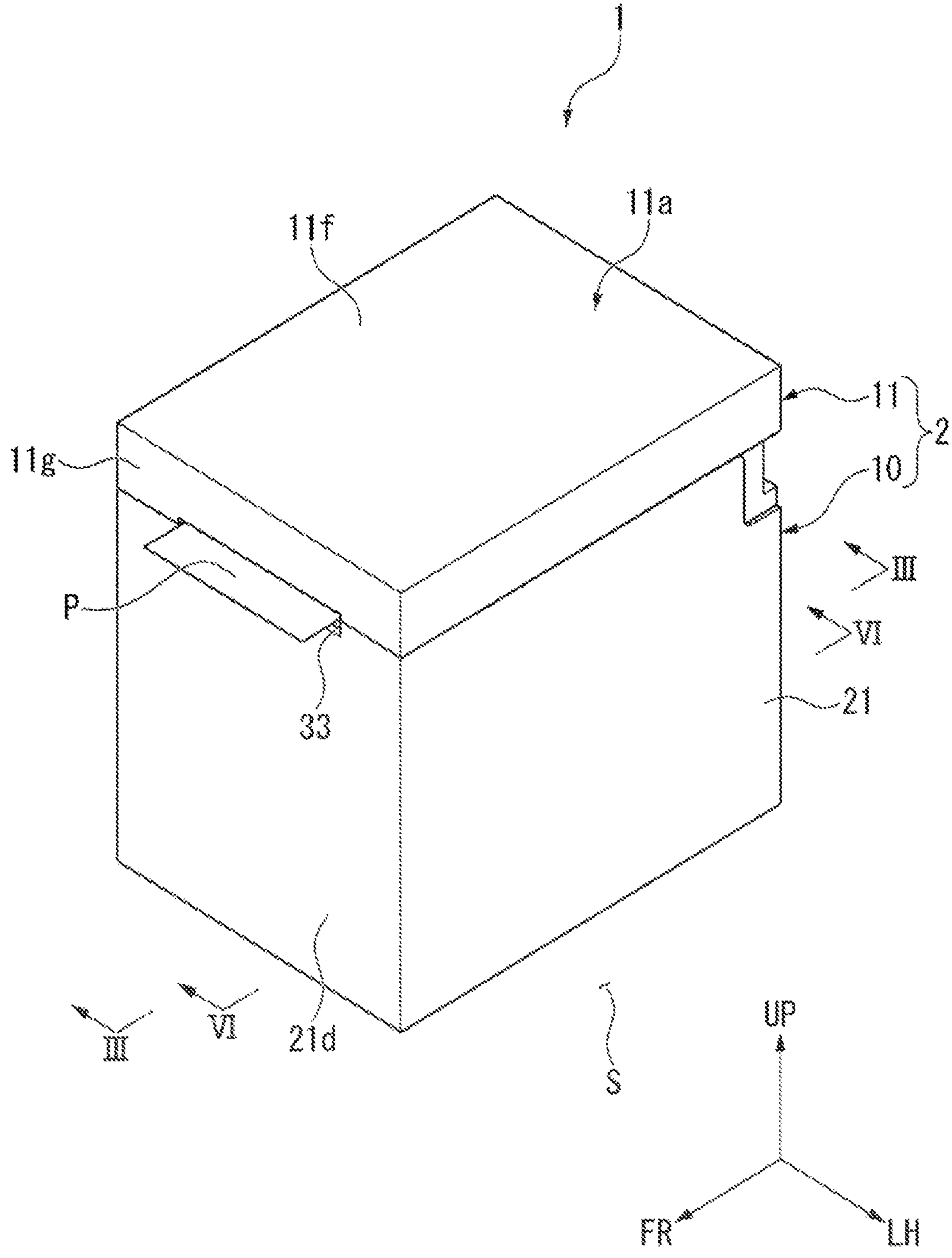
FIG. 1 is a perspective view for illustrating a thermal printer in a state in which a cover is at a closed position.
Figure 2:
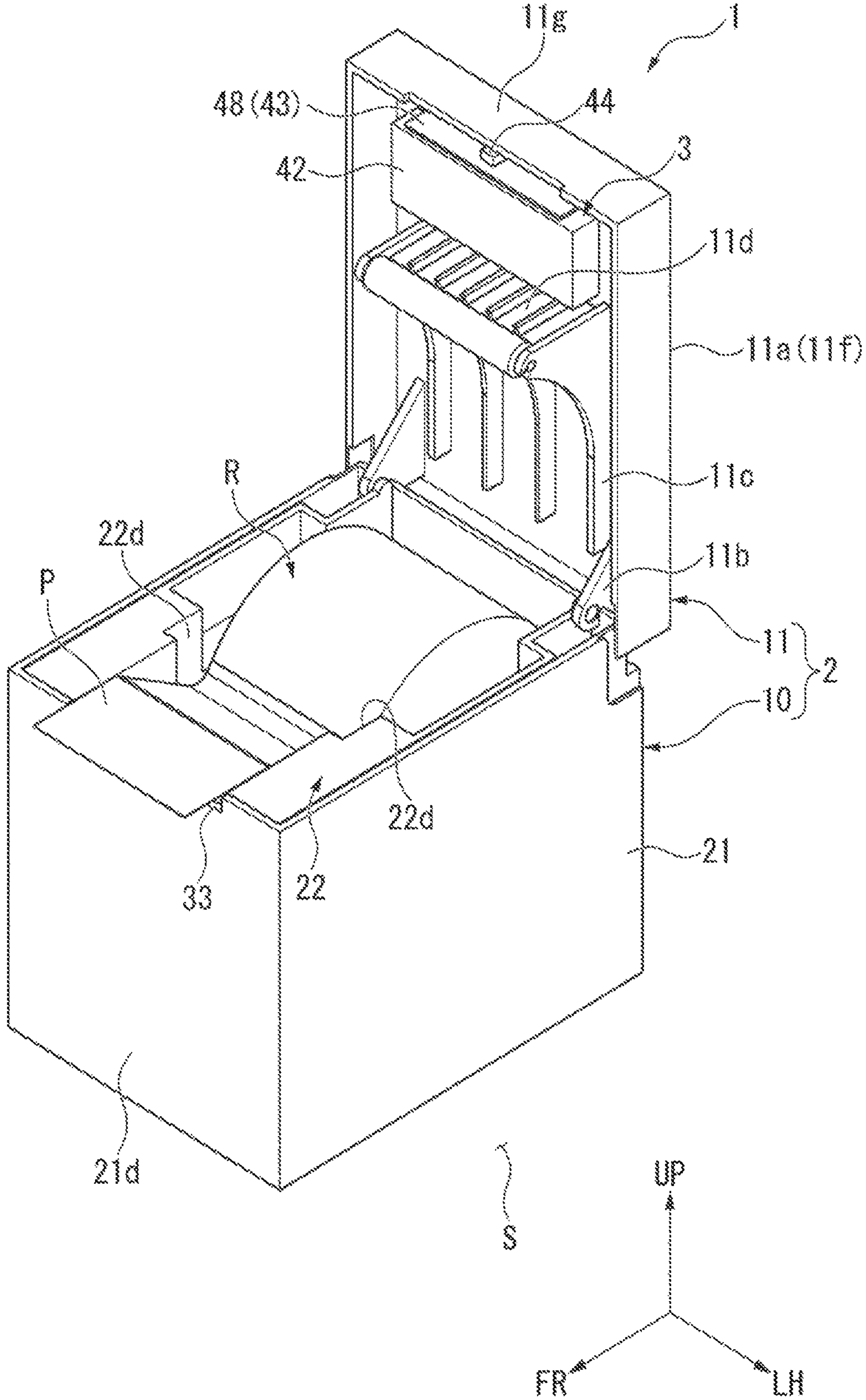
FIG. 2 is a perspective view for illustrating the thermal printer in a state in which the cover is at an open position.

FIG. 1 is a perspective view for illustrating a thermal printer 1 in a state in which a cover 11 is at a closed position. FIG. 2 is a perspective view for illustrating the thermal printer 1 in a state in which the cover 11 is at an open position. As illustrated in FIG. 1 and FIG. 2, the thermal printer 1 performs printing on a recording sheet P. The recording sheet P in this embodiment is a so-called linerless label. That is, a front surface of the recording sheet P forms a print surface, and a back surface of the recording sheet P forms a pressure-sensitive adhesive layer. The print surface is covered with a peeling layer (such as a silicon coating). Under a state in which the print surface is directed outward and the pressure-sensitive adhesive layer is directed inward, the recording sheet P is wound around a tubular core material R1 (see FIG. 3), thereby forming a roll sheet R. The roll sheet R may have a configuration without the core material R1.

Figure 3:
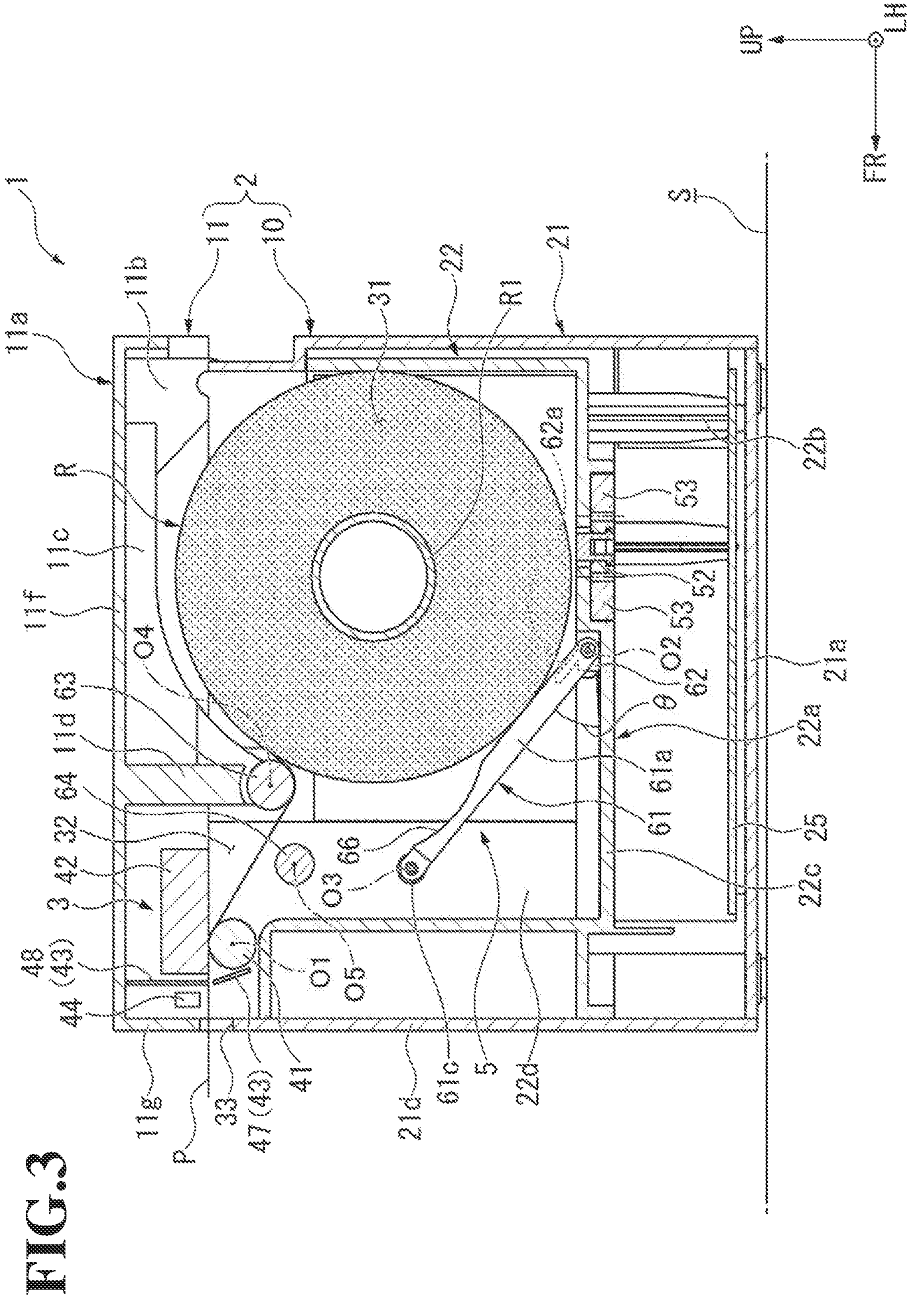
FIG. 3 is a sectional view taken along the line III-III of FIG. 1.

FIG. 3 is a sectional view taken along the III-III of FIG. 1. As illustrated in FIG. 3, the thermal printer 1 includes a casing 2, a printing unit 3, a positioning mechanism 4 (see FIG. 6), and a sheet retaining mechanism 5. The thermal printer 1 is placed on a placement surface S. In the following description, a direction perpendicular to the placement surface S is referred to as an up-and-down direction (the arrow “UP” indicates an upper side), and two directions orthogonal to the up-and-down direction are referred to as a front-and-rear direction (the arrow “FR” indicates a front side) and a right-and-left direction (the arrow “LH” indicates a left side).

The casing 2 is formed into a box shape. Specifically, the casing 2 includes a bottom unit 10 and the cover 11. The bottom unit 10 includes an exterior body 21 and a holder 22.

The exterior body 21 is formed into a box shape opened upward. The exterior body 21 forms a decorative surface (outer surface) of the bottom unit 10. The thermal printer 1 is placed on the placement surface S through intermediation of an exterior bottom wall 21*a* of the exterior body 21. A control board 25 is provided inside the exterior body 21. The control board 25 is arranged along the exterior bottom wall 21*a* with a thickness direction of the control board 25 matching the up-and-down direction.

The holder 22 is provided inside the exterior body 21. The holder 22 includes a holder main body 22*a* and a leg portion 22*b*. The holder main body 22*a* is formed into a box shape having a size slightly smaller than that of the exterior body 21. The holder main body 22*a* defines a roll sheet receiving portion 31 and a sheet passage portion 32.

The roll sheet receiving portion 31 is located in a rear part of an inside of the holder main body 22*a*. The roll sheet receiving portion 31 allows the roll sheet R to be removed therefrom and loaded thereinto through an upper end opening portion of the holder main body 22*a* (bottom unit 10). That is, in the thermal printer 1, the roll sheet R can be loaded into and removed from the roll sheet receiving portion 31 through the upper end opening portion of the holder main body 22*a* (so-called drop-in type). The sheet passage portion 32 is located in a front part of the inside of the holder main body 22*a*. In the sheet passage portion 32, a portion of the recording sheet P drawn from the roll sheet receiving portion 31 is conveyed toward the front side.

The leg portion 22*b* extends downward from a holder bottom wall 22*c* of the holder main body 22*a*. A plurality of leg portions 22*b* are provided at intervals in the front-and-rear direction and the right-and-left direction. Lower end portions of the leg portions 22*b* support the control board 25.

As illustrated in FIG. 2 and FIG. 3, the cover 11 opens and closes the upper end opening portion of the bottom unit 10. Specifically, the cover 11 includes a cover main body 11*a*, mounting pieces 11*b*, guide walls 11*c*, and a partition wall 11*d*. The cover main body 11*a* is formed into a box shape opened downward. In plan view, the cover main body 11*a* has the same shape as that of the bottom unit 10 (exterior body 21). At the closed position, the cover main body 11*a* is superposed on the bottom unit 10 from above, and closes the upper end opening portion of the bottom unit 10. Meanwhile, at the open position, the cover main body 11*a* is retreated from a space above the bottom unit 10, and opens the upper end opening portion of the bottom unit 10.

When the cover 11 (cover main body 11*a*) is at the closed position, a delivery slot 33 is defined between a front wall portion 11*g* of the cover main body 11*a* and a front wall portion 21*d* of the exterior body 21. The delivery slot 33 allows communication between an inside and an outside of the casing 2, and has a slit shape extending in the right-and-left direction. Through the delivery slot 33, the recording sheet P on which printing is performed by the printing unit 3 is delivered toward the front side.

The mounting pieces 11*b* protrude downward from portions of a rear end portion of a top wall portion 11*f* of the cover main body 11*a*, which are located on both sides in the right-and-left direction. The mounting pieces 11*b* are respectively coupled to a pair of holder side walls 22*d* of the holder main body 22*a* opposed to each other in the right-and-left direction. Specifically, the mounting pieces 11*b* are coupled to upper end portions of the holder side walls 22*d* so as to be pivotable about an axis along the right-and-left direction.

With this configuration, the cover 11 pivots relative to the bottom unit 10 between the open position and the closed position. The cover 11 may be configured to open and close the upper end opening portion of the bottom unit 10 through, for example, a sliding operation.

The guide walls 11*c* protrude downward from portions of the top wall portion 11*f* located more on the front side than the mounting pieces 11*b*. The guide walls 11*c* extend while curving downward as extending toward the front side. The guide walls 11*c* are opposed to the roll sheet receiving portion 31 in the up-and-down direction across the upper end opening portion of the bottom unit 10.

The partition wall 11*d* extends downward from a portion of the top wall portion 11*f* located more on the front side than the guide walls 11*c*. When the cover 11 is at the closed position, the partition wall 11*d* is arranged so as to enter the holder main body 22*a* from the upper side. The partition wall 11*d* partitions a space into the roll sheet receiving portion 31 and the sheet passage portion 32 in the front-and-rear direction.

As illustrated in FIG. 3, the printing unit 3 includes a platen roller 41, a thermal head 42, a cutter unit 43, and a sheet detection sensor 44. The platen roller 41 is a rubber roller extending in the right-and-left direction. The platen roller 41 is provided in a front end part of the sheet passage portion 32 (part located closer to the delivery slot 33). The platen roller 41 stretches between upper front end portions of the holder side walls 22*d*. The platen roller 41 is supported on the holder side walls 22*d* so as to be rotatable about an axis O1 along the right-and-left direction. When the recording sheet P is conveyed, the platen roller 41 is rotated in accordance with a driving force of a driving motor (not shown).

The thermal head 42 is provided in a part of an inside of the cover 11 located closer to the delivery slot 33. The thermal head 42 includes a plurality of heating elements linearly arrayed along the right-and-left direction. The thermal head 42 is fixed to a front end portion of the cover 11 under a state in which the heating elements are directed downward. The platen roller 41 and the thermal head 42 are opposed to each other in the up-and-down direction across the delivery slot 33 (arranged on one side and another side with respect to the delivery slot 33). When the cover 11 is at the closed position, the thermal head 42 is held in close contact with the platen roller 41. The recording sheet P is caused to pass through a space between the platen roller 41 and the thermal head 42 along with rotation of the platen roller 41. A heating pattern of the heating elements of the thermal head 42 is controlled based on a signal output from the control board 25. When heat of the heating elements is transferred to the print surface of the recording sheet P, information (such as characters and figures) associated with the heating pattern is printed on the print surface.

Figure 4:
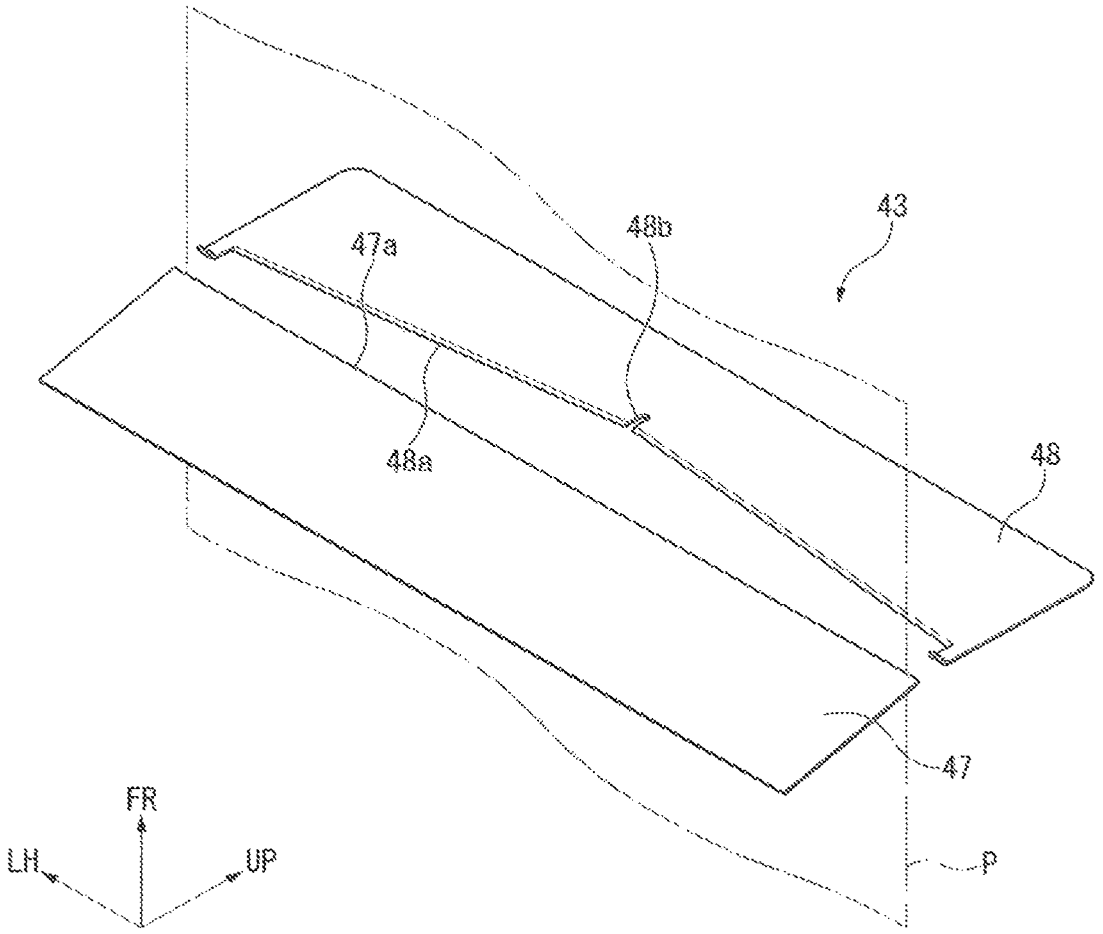
FIG. 4 is a perspective view for illustrating a cutter unit.

FIG. 4 is a perspective view for illustrating the cutter unit 43. As illustrated in FIG. 3 and FIG. 4, the cutter unit 43 includes a fixed blade 47 and a movable blade 48. The fixed blade 47 is arranged in a part of an inside of the bottom unit 10 located between the platen roller 41 and the delivery slot 33. The fixed blade 47 is formed into a plate-like shape extending in the right-and-left direction. The fixed blade 47 is arranged under a state in which a blade edge 47*a* of the fixed blade 47 is directed upward. The movable blade 48 is arranged in a part of the inside of the cover 11 located between the thermal head 42 and the delivery slot 33. The movable blade 48 is formed into a plate-like shape extending in the right-and-left direction. The movable blade 48 is configured to be movable up and down under a state in which a blade edge 48*a* of the movable blade 48 is directed downward. When the movable blade 48 is moved downward, the movable blade 48 climbs over the fixed blade 47 from the front side, and thus the cutter unit 43 cuts the recording sheet P between the blade edges 47*a* and 48*a*.

As illustrated in FIG. 4, the blade edge 48*a* of the movable blade 48 is formed into a V shape extending in a direction (upward direction) of retreating from the blade edge 47*a* of the fixed blade 47 as extending from each end portion in the right-and-left direction toward a center portion of the blade edge 48*a*. In the center portion of the blade edge 48*a* of the movable blade 48 in the right-and-left direction, a recessed portion 48*b* is formed to be recessed from the blade edge 48*a*. A bottom of the recessed portion 48*b* is configured so as to be prevented from coming into contact with the recording sheet P when the cutter unit 43 cuts the recording sheet P. With this configuration, when the cutter unit 43 cuts the recording sheet P, an uncut portion is left at a portion of the recording sheet P opposed to the recessed portion 48*b* (so-called partial cutting). In this embodiment, description is made of a configuration in which one recessed portion 48*b* is formed, and thus one uncut portion is left (one portion is uncut), but the present invention is not limited to this configuration. For example, a plurality of recessed portions 48*b* may be formed, and thus a plurality of uncut portions may be left (a plurality of portions are uncut). Further, the recessed portion 48*b* is not an essential component.

As illustrated in FIG. 3, the sheet detection sensor 44 is provided in a part of the inside of the cover 11 located more on the front side than the movable blade 48. The sheet detection sensor 44 is, for example, a reflective photosensor. The sheet detection sensor 44 detects whether or not a portion of the recording sheet P has passed through the cutter unit 43. That is, the sheet detection sensor 44 detects whether or not there is a portion of the recording sheet P located more on the front side (downstream side) than an uncut portion left after the recording sheet P is cut by the cutter unit 43.

Figure 5:
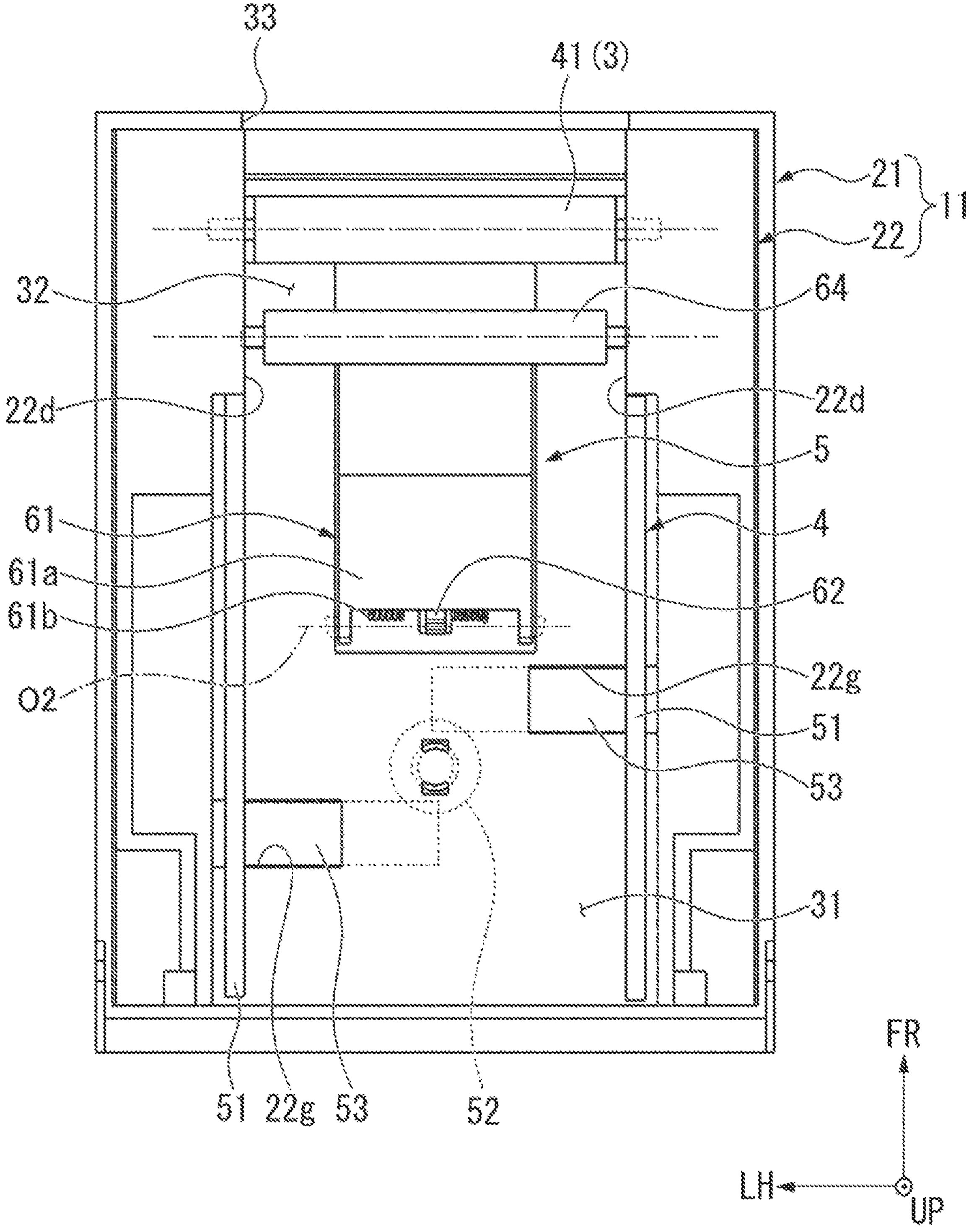
FIG. 5 is a plan view for illustrating an interior of a bottom unit.
Figure 6:
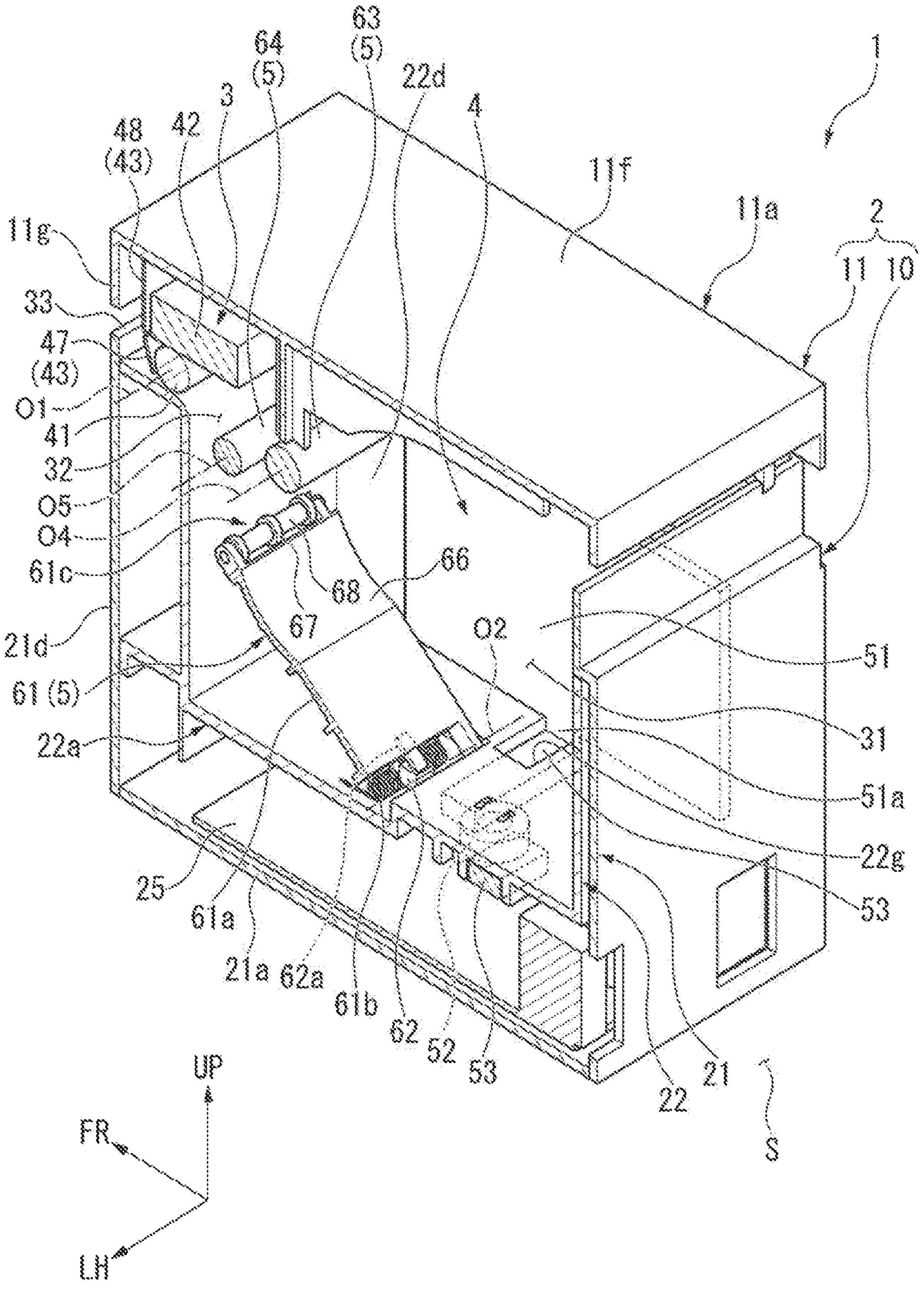
FIG. 6 is a perspective sectional view taken along the line VI-VI of FIG. 1.

FIG. 5 is a plan view for illustrating an interior of the bottom unit 10. FIG. 6 is a perspective sectional view taken along the line VI-VI of FIG. 1. As illustrated in FIG. 5 and FIG. 6, the positioning mechanism 4 positions the roll sheet R in the right-and-left direction in the roll sheet receiving portion 31. The positioning mechanism 4 includes a pair of guide walls 51, a pinion 52, and racks 53.

The guide walls 51 are provided in the roll sheet receiving portion 31 (in the holder 22) so as to be opposed to each other in the right-and-left direction. The guide walls 51 each include a protruding portion 51*a* (see FIG. 6) protruding downward. The protruding portion 51*a* protrudes below the holder bottom wall 22*c* through a through-hole 22*g* formed in the holder bottom wall 22*c*. The through-hole 22*g* is formed into a slit shape extending in the right-and-left direction. The guide walls 51 are configured so as to be movable in a direction of coming close to or separating away from each other (right-and-left direction) under a state in which the protruding portions 51*a* are guided in the through-holes 22*g*.

The pinion 52 is provided on the holder bottom wall 22*c* so as to be directed downward. Specifically, the pinion 52 is provided on a portion of the holder bottom wall 22*c*, which defines the roll sheet receiving portion 31, and corresponds to a center portion in the front-and-rear direction and the right-and-left direction. The pinion 52 is supported on the holder bottom wall 22*c* so as to be rotatable about an axis along the up-and-down direction.

The racks 53 are respectively coupled to the pair of guide walls 51 through intermediation of the protruding portions 51*a*. The racks 53 extend below the holder bottom wall 22*c* in the right-and-left direction toward the guide walls 51 opposed to each other. One of the racks 53 extending from one of the guide walls 51 meshes with the pinion 52 from one side in the front-and-rear direction (for example, the front side). Another one of the racks 53 extending from another one of the guide walls 51 meshes with the pinion 52 from another side in the front-and-rear direction (for example, the rear side). Accordingly, in the positioning mechanism 4, the pinion 52 is rotated by a linear driving force applied to one of the racks 53, and thus a rotational driving force of the pinion 52 is transmitted to another one of the racks 53. In this manner, the racks 53 are moved in the right-and-left direction so as to come close to or separate away from each other, and thus the pair of guide walls 51 are moved synchronously.

The sheet retaining mechanism 5 includes a flap unit 61, a near-end sensor (sensor) 62, a first guide roller 63, and a second guide roller 64. The flap unit 61 partitions the inside of the holder main body 22*a* in the front-and-rear direction into the roll sheet receiving portion 31 and the sheet passage portion 32, and presses the roll sheet R in a direction of separating away from the delivery slot 33 (rearward direction). In this embodiment, a part of the inside of the holder main body 22*a* located more on the rear side than the partition wall 11*d* and the flap unit 61 forms the roll sheet receiving portion 31, and a part of the inside of the holder main body 22*a* located more on the front side than the partition wall 11*d* and the flap unit 61 forms the sheet passage portion 32.

As illustrated in FIG. 3, FIG. 5, and FIG. 6, the flap unit 61 includes a flap 61*a*, an urging member 61*b*, and a flap roller 61*c*. The flap 61*a* extends upward in a cantilevered manner from a portion of the holder bottom wall 22*c* located more on the front side than the pinion 52 and more on the rear side than the partition wall 11*d*. The flap 61*a* is supported on the holder bottom wall 22*c* at a lower end portion of the flap 61*a* so as to be pivotable about an axis (first axis) O2 along the right-and-left direction. A length of the flap 61*a* is set so as to prevent the flap 61*a* from interfering with the first guide roller 63 in an entire pivoting range of the flap 61*a*.

A curved surface 66 is formed on a surface (rear surface) of a distal end portion of the flap 61*a*, which is directed in a clockwise direction about the axis O2. The curved surface 66 is formed into an arc shape protruding in a counterclockwise direction (toward the front side) about the axis O2. The curved surface 66 retains an outer peripheral surface of the roll sheet R when, for example, the roll sheet R has a small diameter.

The urging member 61*b* is, for example, a torsion spring. The urging member 61*b* is interposed between the flap 61*a* and the holder bottom wall 22*c*. The urging member 61*b* urges the flap 61*a* toward the rear side (in the clockwise direction). The flap roller 61*c* is provided at a portion of the distal end portion of the flap 61*a*, which is located more on the distal end side than the curved surface 66, so as to be rotatable about an axis (second axis) O3 along the right-and-left direction. The flap roller 61*c* includes large-diameter portions 67 and small-diameter portions 68 arranged alternately and continuously in the right-and-left direction. The flap roller 61*c* can be brought into contact with the recording sheet P at the large-diameter portions 67.

The near-end sensor 62 is provided on the holder bottom wall 22*c* at a vicinity of a proximal end portion of the flap unit 61 (flap 61*a*). In the clockwise direction about the axis O2, the near-end sensor 62 detects a near end of the roll sheet R based on a pivot angle θ of the flap unit 61 with respect to the holder bottom wall 22*c*. The near end refers to a state in which a remaining amount of the roll sheet R has reached an amount (outer diameter) recommended to replace the roll sheet R.

The near-end sensor 62 includes a lever 62*a* that is pivotable in the front-and-rear direction. The lever 62*a* is connected to the flap 61*a*. When the lever 62*a* pivots in the front-and-rear direction along with pivoting of the flap 61*a*, the near-end sensor 62 is switched between an ON state and an OFF state.

When the pivot angle θ of the flap 61*a* with respect to the holder bottom wall 22*c* is smaller than a predetermined angle, the near-end sensor 62 keeps the OFF state (the lever 62*a* does not perform an ON operation). Meanwhile, when the flap 61*a* pivots so that the pivot angle θ of the flap 61*a* reaches the predetermined angle, the near-end sensor 62 is brought into the ON state. In this embodiment, the predetermined angle is, for example, about 100° with respect to the holder bottom wall 22*c*. At the predetermined angle, a distal end portion of the flap unit 61 is most distant from the delivery slot 33.

When the lever 62*a* performs the ON operation, the near-end sensor 62 outputs an ON signal to the control board 25. When the control board 25 receives the ON signal from the near-end sensor 62, the control board 25 causes an informing unit (such as a light source and a sound source) provided in the casing 2 to recommend a user to replace the roll sheet R. When the lever 62*a* reaches a rearmost end position (ON position), the flap 61*a* is restrained from further pivoting in the clockwise direction (toward the rear side). Meanwhile, when the lever 62*a* reaches a foremost end position (OFF position), the flap 61*a* is restrained from further pivoting in the counterclockwise direction. That is, the lever 62*a* of the near-end sensor 62 also functions as a stopper configured to limit the pivoting range of the flap 61*a*. However, a stopper separate from the near-end sensor 62 may be provided for the flap 61*a*.

The first guide roller 63 leads, toward the printing unit 3, the recording sheet P to be drawn from the roll sheet R. The first guide roller 63 is a driven roller that is rotated by, for example, friction generated between the recording sheet P and the first guide roller 63 along with conveyance of the recording sheet P. The first guide roller 63 is supported on a lower end portion of the partition wall 11*d* so as to be rotatable about an axis (third axis) O4 along the right-and-left direction. That is, the first guide roller 63 is caused to enter and retreat from the holder main body 22*a* along with an opening and closing operation of the cover 11. The axis O4 of the first guide roller 63 is located more on the front side and the upper side (downstream side in a conveying direction of the recording sheet P) than the axis O2 of the flap unit 61. The axis O4 of the first guide roller 63 is located more on the rear side and the lower side (upstream side in the conveying direction of the recording sheet P) than the axis O1 of the platen roller 41. In the illustrated example, an outer diameter of the first guide roller 63 is equal to an outer diameter of the platen roller 41.

It is preferred that the first guide roller 63 be designed in consideration of impact absorbing performance against, for example, contact of the roll sheet R. As such a configuration, it is preferred that, similarly to the platen roller 41, an outer surface of the first guide roller 63 be made of, among elastically deformable materials such as a rubber material, a material softer than a material for the second guide roller 64.

The second guide roller 64 is provided in the sheet passage portion 32 between the platen roller 41 and the first guide roller 63. The second guide roller 64 is a driven roller that is rotated by, for example, friction generated between the recording sheet P and the second guide roller 64 along with conveyance of the recording sheet P. The second guide roller 64 is supported on the holder side walls 22*d* so as to be rotatable about an axis (fourth axis) O5 along the right-and-left direction. The axis O5 of the second guide roller 64 is arranged more on the front side and the lower side (downstream side in the conveying direction of the recording sheet P) than the axis O4 of the first guide roller 63. The axis O5 of the second guide roller 64 is located more on the rear side and the lower side (upstream side in the conveying direction of the recording sheet P) than the axis O1 of the platen roller 41. In the illustrated example, the second guide roller 64 has a diameter smaller than the diameter of the first guide roller 63.

It is preferred that the second guide roller 64 be designed in consideration of, for example, cost reduction and peelability from the pressure-sensitive adhesive layer. As such a configuration, an outer surface of the second guide roller 64 may be made of, among elastically deformable materials such as a resin material, a material harder than the material for the first guide roller 63. The first guide roller 63 and the second guide roller 64 may be rotated independently of each other in accordance with, for example, the driving force of the driving motor (not shown).

A space in the sheet passage portion 32 between the first guide roller 63 and the second guide roller 64 forms a sheet passing path through which the recording sheet P passes between the roll sheet receiving portion 31 and the printing unit 3. When the recording sheet P passes through the sheet passing path, the recording sheet P is brought into contact with the first guide roller 63 or the second guide roller 64, and thus is restrained from moving in a thickness direction (up-and-down direction) of the recording sheet P. With this configuration, an entry angle of the recording sheet P into the printing unit 3 is limited within a predetermined angle range.

Next, operations of the above-mentioned thermal printer 1 are described. First, a method of setting the roll sheet R is described. As illustrated in FIG. 2, after the cover 11 is set to the open position, the roll sheet R is loaded into the roll sheet receiving portion 31. Then, the roll sheet R falls into the roll sheet receiving portion 31 while the outer peripheral surface of the roll sheet R is brought into slide contact with a holder rear wall of the holder main body 22*a* and the flap 61*a*. Thus, the flap 61*a* pivots counterclockwise against an urging force of the urging member 61*b*. That is, the roll sheet R is caused to enter the roll sheet receiving portion 31 so as to expand the roll sheet receiving portion 31 toward the front side. Pivoting of the flap 61*a* in the counterclockwise direction is restrained when the lever 62*a* reaches the foremost end position. Thus, under a state in which the roll sheet R is supported by the holder rear wall and the flap 61*a*, the roll sheet R is received in the roll sheet receiving portion 31. In this case, the urging force of the urging member 61*b* is applied to the roll sheet R through the flap 61*a*, and thus the roll sheet R is retained in the roll sheet receiving portion 31 under a state in which the roll sheet R is pressed toward the rear side. In the illustrated example, the roll sheet R is spaced above the holder bottom wall 22*c*, but the outer peripheral surface of the roll sheet R may be held in contact with the holder bottom wall 22*c* in accordance with an outer diameter of the roll sheet R. When the lever 62*a* is moved to the foremost end position, the near-end sensor 62 is brought into the OFF state.

After the roll sheet R is loaded, a leading edge portion of the recording sheet P is guided to the delivery slot 33 along the second guide roller 64 and the platen roller 41. Under this state, the cover 11 is moved to the closed position. Then, a root portion (boundary portion with the roll sheet R) of the recording sheet P drawn from the roll sheet R is pressed downward by the first guide roller 63, and the leading edge portion is sandwiched between the platen roller 41 and the thermal head 42. Thus, the roll sheet R is set in the roll sheet receiving portion 31 under a state in which a center axis of the roll sheet R matches the right-and-left direction.

Next, a method of positioning the roll sheet R is described. After the roll sheet R is set in the roll sheet receiving portion 31, the guide walls 51 are moved in conformity with a sheet width of the roll sheet R. Specifically, under a state in which at least one of the guide walls 51 is grasped, the at least one of the guide walls 51 is pressed in the right-and-left direction toward an end surface of the roll sheet R. Then, a pressing force applied to one of the guide walls 51 is also applied to another one of the guide walls 51 through the pinion 52, and thus the guide walls 51 are moved synchronously in a direction of coming close to or separating away from each other. At a point in time when the guide walls 51 are brought close to or brought into abutment against the end surfaces of the roll sheet R, the guide walls 51 are stopped. In this manner, a center of the roll sheet R in the right-and-left direction is positioned near a center of the roll sheet receiving portion 31 in the right-and-left direction. In this embodiment, the guide walls 51 merely position the roll sheet R in the right-and-left direction, and do not support rotation of the roll sheet R.

Subsequently, a method of performing printing on the recording sheet P is described. Under a state in which the recording sheet P is sandwiched between the platen roller 41 and the thermal head 42, along with rotation of the platen roller 41, the recording sheet P is conveyed toward the delivery slot 33. At this time, the heating elements of the thermal head 42 generate heat as appropriate, and thus various kinds of information is printed on the recording sheet P. After passing through a space between the fixed blade 47 and the movable blade 48, the recording sheet P on which printing is performed by the thermal head 42 is delivered to an outside of the thermal printer 1 through the delivery slot 33.

After printing on the recording sheet P is finished, the recording sheet P is cut. Specifically, the movable blade 48 is moved downward so that the movable blade 48 climbs over the fixed blade 47 from the front side. Thus, the recording sheet P is sandwiched between the blade edge 47*a* of the fixed blade 47 and the blade edge 48*a* of the movable blade 48. In this manner, the recording sheet P is cut. In this embodiment, a bottom of the recessed portion 48*b* of the movable blade 48 is configured to be prevented from coming into contact with the blade edge 47*a* of the fixed blade 47. With this configuration, a printed portion of the recording sheet P is continuous with the roll sheet R through intermediation of the uncut portion left on the recording sheet P. After cutting by the cutter unit 43, the uncut portion left on the recording sheet P is torn, thereby being capable of taking out a piece of the recording sheet P for which printing is finished.

In this embodiment, a linerless label is used as the recording sheet P. Accordingly, the piece of the recording sheet P taken out of the thermal printer 1 can be bonded to various kinds of products through intermediation of the pressure-sensitive adhesive layer as it is.

Subsequently, operations of the sheet retaining mechanism 5 are described. When a printing operation is continuously performed on the recording sheet P to be drawn from the roll sheet R, the outer diameter of the roll sheet R gradually decreases. That is, along with continuous use, the roll sheet R is brought into a state of having a middle diameter as illustrated in FIG. 7 and FIG. 8, and then is brought into a state of having a small diameter as illustrated in FIG. 9 and FIG. 10.

Figure 7:
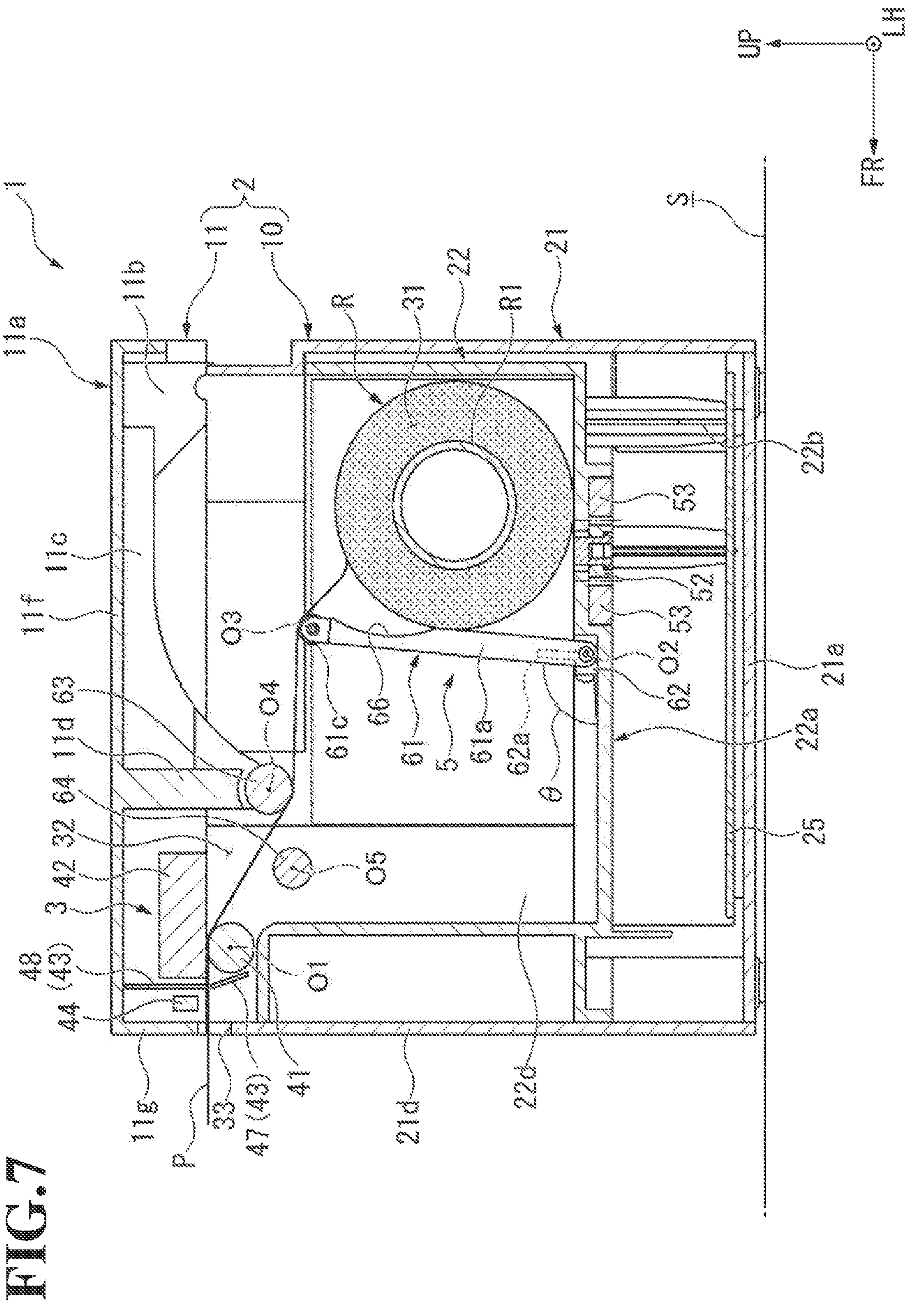
FIG. 7 is a sectional view corresponding to FIG. 3, for illustrating a roll sheet having a middle diameter at the time of stoppage of conveyance.

Under a state in which the roll sheet R has the middle diameter as illustrated in FIG. 7, at the time of stoppage of conveyance, the roll sheet R is pressed toward the rear side by the flap 61*a*. In this case, under a state in which the roll sheet R is held in contact with the flap 61*a*, the holder bottom wall 22*c*, and the holder rear wall, the roll sheet R is retained in a rear part of the roll sheet receiving portion 31. Further, under a state in which the portion of the recording sheet P drawn from the roll sheet R is guided along the flap roller 61*c*, the first guide roller 63, and the second guide roller 64, the drawn portion is led to the printing unit 3. When conveyance is stopped under a state in which the roll sheet R has the middle diameter, the roll sheet R restrains the flap 61*a* from pivoting in the clockwise direction. With this configuration, the pivot angle θ of the flap 61*a* is regulated within a range smaller than the predetermined angle. That is, under a state in which the roll sheet R has the middle diameter, the near-end sensor 62 keeps the OFF state.

Figure 8:
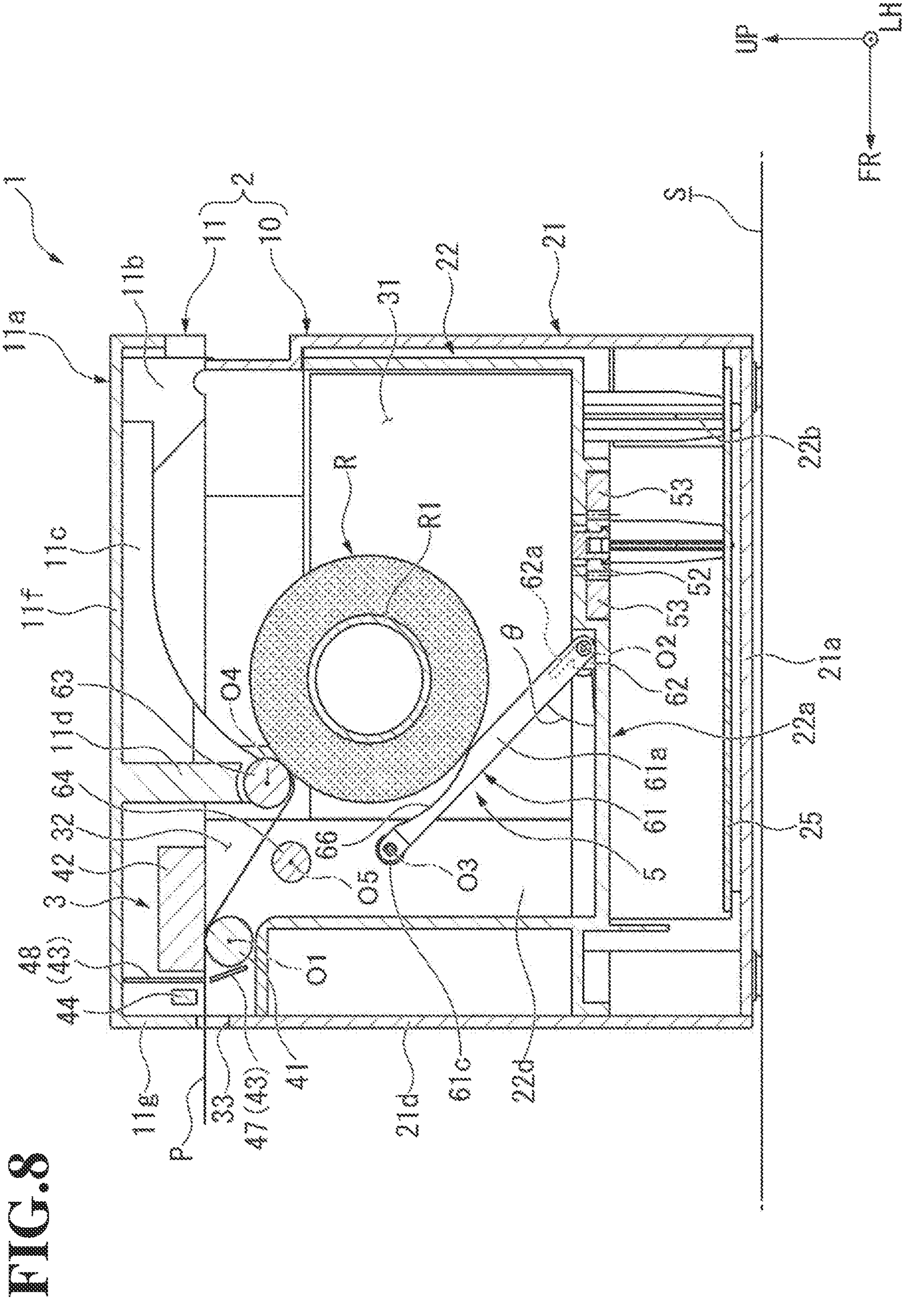
FIG. 8 is a sectional view corresponding to FIG. 3, for illustrating the roll sheet having the middle diameter during conveyance.

Meanwhile, under a state in which the roll sheet R has the middle diameter as illustrated in FIG. 8, when the printing operation is started, the roll sheet R is moved toward the delivery slot 33 in accordance with a pulling force applied to the roll sheet R by rotation of the platen roller 41. Specifically, by the pulling force applied to the roll sheet R, the flap 61*a* pivots in the counterclockwise direction, and the roll sheet R is moved on the rear surface of the flap 61*a* from the proximal end portion toward the distal end portion of the flap 61*a*. After that, the roll sheet R is brought into contact with the first guide roller 63, thereby being restrained from moving to the front side. In this manner, under a state in which the roll sheet R is pressed by the flap 61*a* toward the rear side while being held in contact with the first guide roller 63, printing is performed on the recording sheet P. That is, the recording sheet P is drawn by rotation of the platen roller 41, and thus the roll sheet R is rotated under a state of being held in contact with the first guide roller 63 and the flap 61*a*.

Figure 9:
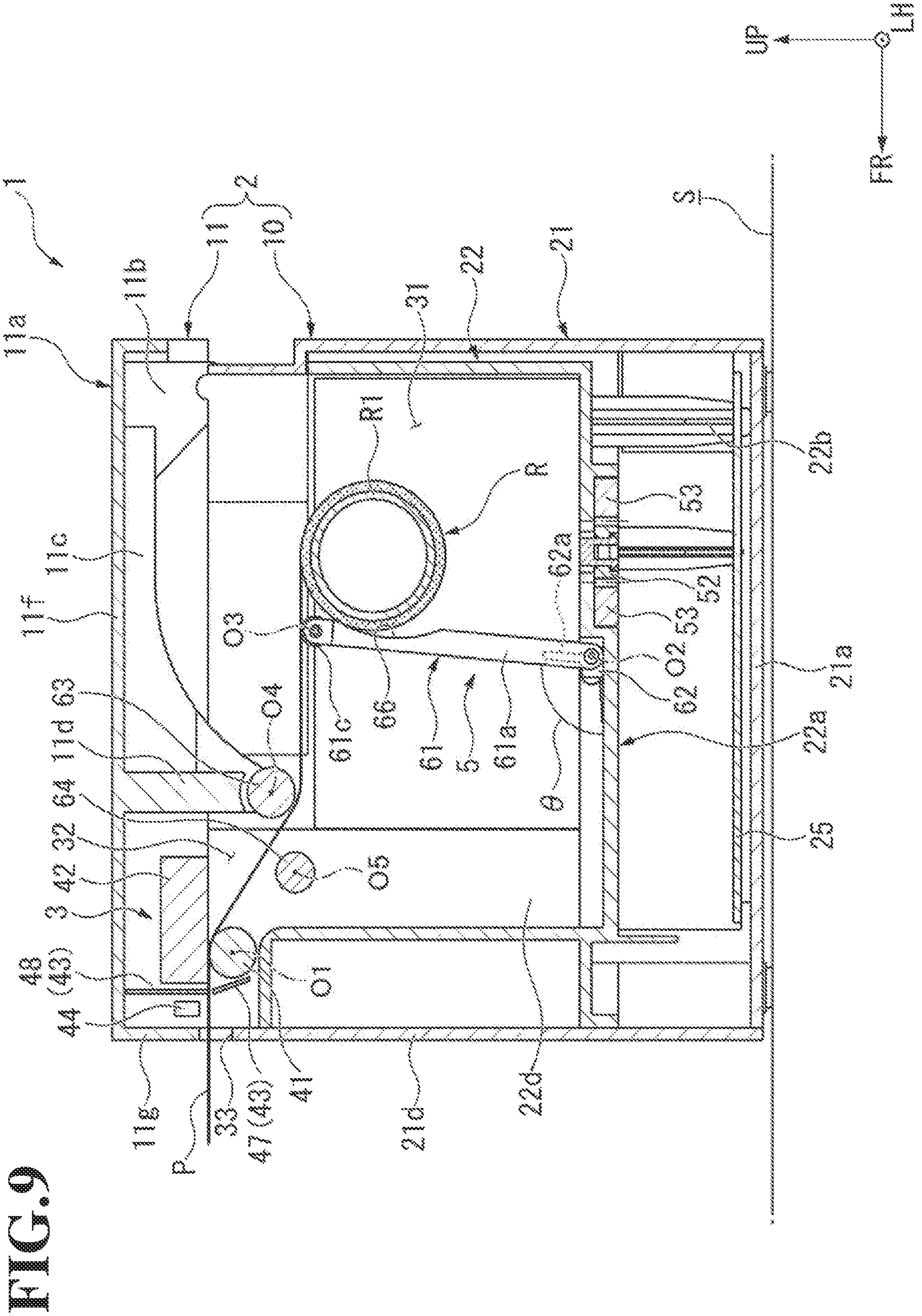
FIG. 9 is a sectional view corresponding to FIG. 3, for illustrating a roll sheet having a small diameter at the time of stoppage of conveyance.
Figure 10:
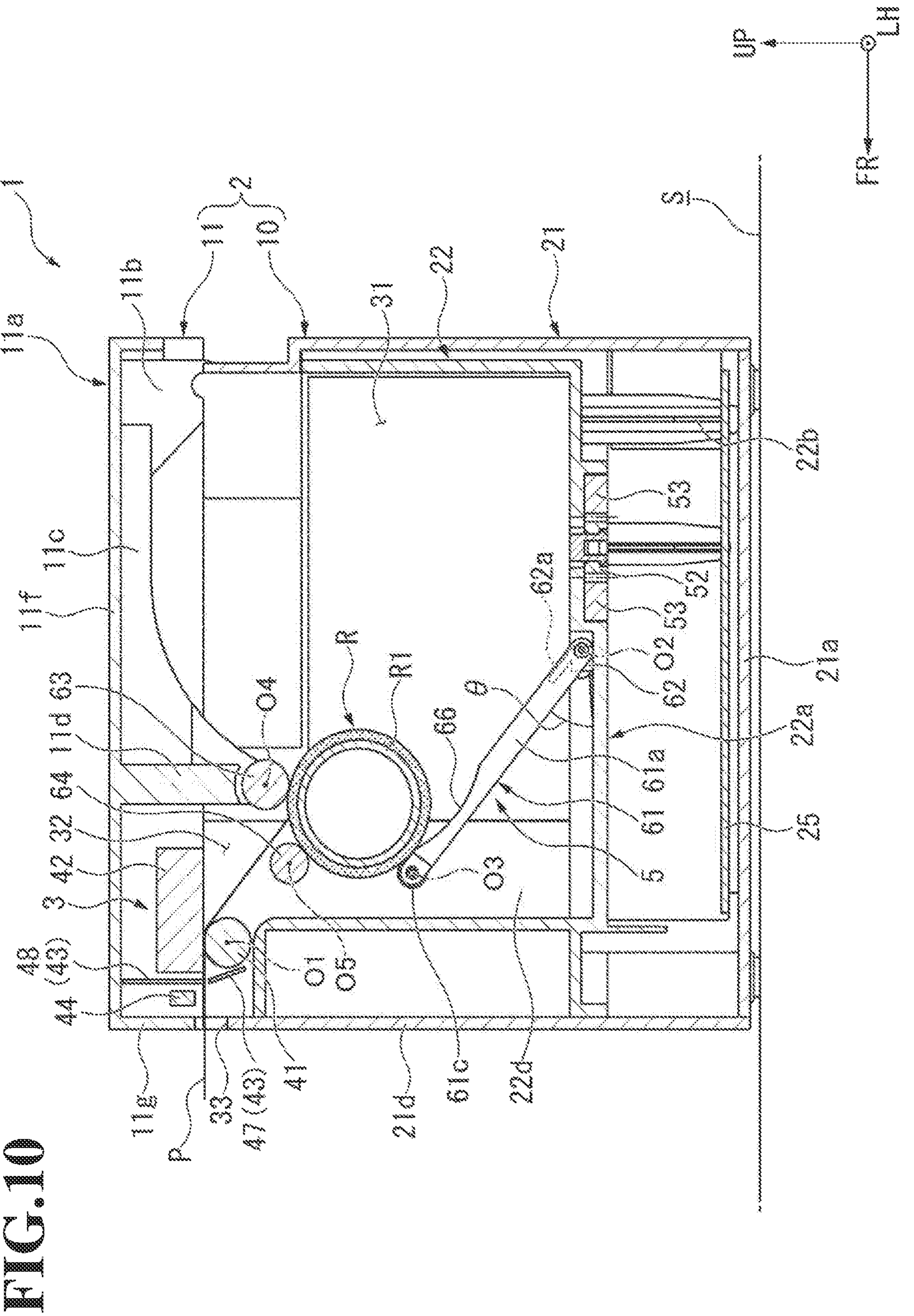
FIG. 10 is a sectional view corresponding to FIG. 3, for illustrating the roll sheet having the small diameter during conveyance.

Under a state in which the roll sheet R has the small diameter as illustrated in FIG. 9, at the time of stoppage of conveyance, the roll sheet R is pressed by the flap 61*a* toward the rear side. In this case, under a state in which the roll sheet R is held in contact with the curved surface 66, the roll sheet R is retained at a distance from the holder bottom wall 22*c* and the holder rear wall. Thus, the roll sheet R can be restrained from slipping upward away from the flap 61*a*. Further, under a state in which the portion of the recording sheet P drawn from the roll sheet R is guided along the flap roller 61*c*, the first guide roller 63, and the second guide roller 64, the drawn portion is led to the printing unit 3.

In a case in which conveyance is stopped under a state in which the roll sheet R has the small diameter, when the pivot angle θ of the flap 61*a* reaches the predetermined angle, the ON operation is performed on the near-end sensor 62 by the lever 62*a*. When the near-end sensor 62 is brought into the ON state, the near-end sensor 62 outputs the ON signal to the control board 25. When the control board 25 receives the ON signal from the near-end sensor 62, the control board 25 causes the informing unit (such as a light source and a sound source) provided in the casing 2 to recommend a user to replace the roll sheet R.

Under a state in which the roll sheet R has the small diameter as illustrated in FIG. 10, when the printing operation is started, the roll sheet R is moved toward the delivery slot 33 in accordance with the pulling force applied to the roll sheet R by rotation of the platen roller 41. Specifically, by the pulling force applied to the roll sheet R, the flap 61*a* pivots in the counterclockwise direction. After that, the roll sheet R is brought into contact with both the first guide roller 63 and the second guide roller 64, thereby being restrained from moving to the front side. In this manner, under a state in which the roll sheet R is pressed by the flap 61*a* toward the rear side while being held in contact with the first guide roller 63 and the second guide roller 64, printing is performed on the recording sheet P. That is, the recording sheet P is drawn by rotation of the platen roller 41, and thus the roll sheet R is rotated under a state of being held in contact with the first guide roller 63, the second guide roller 64, and the flap 61*a*.

As described above, in this embodiment, there is adopted the configuration in which, in a space of the casing 2 between the printing unit 3 and the roll sheet receiving portion 31, there are provided the flap 61*a* pivotable about the axis O2, and the urging member 61*b* configured to urge the flap 61*a* about the axis O2 in a direction of separating away from the delivery slot 33. With this configuration, the roll sheet R is always pressed by the flap 61*a* in a direction of separating away from the delivery slot 33, and thus a position of the roll sheet R (in the front-and-rear direction or the up-and-down direction) in the roll sheet receiving portion 31 is likely to be stable. Accordingly, even in a case in which a large pulling force is required for conveyance of the recording sheet P as in a case of conveyance of a linerless label, the recording sheet P can be stably conveyed without being affected by the outer diameter of the roll sheet R. In addition, in this embodiment, it is not required that the roll sheet R be retained at the core material R1 of the roll sheet R. Thus, the roll sheet R can be easily removed from and loaded into the roll sheet receiving portion 31, and the configuration can be simplified.

In this embodiment, there is adopted the configuration in which the flap roller 61*c* is provided at the distal end portion of the flap 61*a* so as to be rotatable about the axis O3. With this configuration, a frictional force applied between the distal end portion of the flap unit 61 and the recording sheet P is reduced, thereby being capable of smoothly conveying the recording sheet P.

In this embodiment, there is adopted the configuration in which the recording sheet P is led to the printing unit 3 through a space between the first guide roller 63 and the second guide roller 64. With this configuration, the first guide roller 63 and the second guide roller 64 can limit a movement range of the recording sheet P to be drawn from the roll sheet R. Thus, irrespective of the position of the roll sheet R in the roll sheet receiving portion 31, the recording sheet P is led to the printing unit 3 within the predetermined angle range. Accordingly, the recording sheet P can be stably fed toward the printing unit 3.

In this embodiment, there is adopted the configuration in which the first guide roller 63 is made of the material softer than the material for the second guide roller 64. With this configuration, an impact applied to the first guide roller 63 when the roll sheet R is brought into contact with the first guide roller 63 is likely to be relieved. Accordingly, for example, generation of noise accompanied with movement of the roll sheet R in the roll sheet receiving portion 31 can be suppressed.

In this embodiment, there is adopted the configuration in which the near-end sensor 62 includes the lever 62*a* that is connected to the flap 61*a*, and is pivotable between the ON position and the OFF position along with pivoting of the flap 61*a*. With this configuration, the lever 62*a* of the near-end sensor 62 pivots in synchronization with the flap 61*a*, and thus the near-end sensor 62 is switched between the ON state and the OFF state in accordance with the pivot angle of the flap 61*a*. Accordingly, as compared to a case in which a mechanism configured to operate the lever 62*a* is provided separately from the flap unit 61, the configuration can be simplified.

In this embodiment, there is provided the positioning mechanism 4 configured to position the roll sheet R in the roll sheet receiving portion 31 in the right-and-left direction (first direction) along the center axis of the roll sheet R. The positioning mechanism 4 includes the guide walls 51 that are configured so as to be movable in the right-and-left direction, and are brought into abutment against the roll sheet R from both sides in the right-and-left direction. With this configuration, the guide walls 51 are brought into abutment against the roll sheet R, and thus can restrain the roll sheet R from moving in the roll sheet receiving portion 31 in the right-and-left direction. Thus, the guide walls 51 are moved in conformity with the sheet width of the roll sheet R, thereby being capable of suppressing movement of the roll sheet R in the roll sheet receiving portion 31 in the right-and-left direction irrespective of the sheet width of the roll sheet R. As a result, for example, printing misregistration, and generation of noise accompanied with movement of the roll sheet R in the roll sheet receiving portion 31 can be suppressed.

In this embodiment, there is adopted the configuration in which, in the center portion of the blade edge 48*a* of the movable blade 48 in the right-and-left direction, the recessed portion 48*b* is formed to be recessed from the blade edge 48*a*. With this configuration, the recording sheet P is cut so as to be prevented from coming into contact with the bottom of the recessed portion 48*b*, and thus an uncut portion is left at the portion of the recording sheet P opposed to the recessed portion 48*b*. Accordingly, even when a linerless label is used as the recording sheet P, the cut piece of the recording sheet P can be prevented from adhering to an unexpected place. In particular, in this embodiment, the positioning mechanism 4 is provided as described above. Thus, the center of the roll sheet R in the right-and-left direction is positioned near the center of the roll sheet receiving portion 31 in the right-and-left direction. As a result, irrespective of the sheet width of the roll sheet R, an uncut portion can be left near the center of the recording sheet P in the right-and-left direction.

The technical scope of the present invention is not limited to the above-mentioned embodiment, and various modifications may be made thereto without departing from the gist of the present invention. In the above-mentioned embodiment, description is made of the thermal printer 1 of the drop-in type (loading type) as an example, but the present invention is not limited to this configuration. The thermal printer 1 may be of an axial support type in which the roll sheet R is supported at the core material R1 so as to be rotatable. In the above-mentioned embodiment, description is made of the case in which a linerless label is used as the recording sheet P, but the present invention is not limited to this configuration. In the above-mentioned embodiment, description is made of the configuration in which the delivery slot 33 is opened toward the front side, but the present invention is not limited to this configuration. The delivery slot 33 may be formed to be directed in an optional direction. In the above-mentioned embodiment, description is made of the configuration in which the platen roller 41 and the fixed blade 47 are provided on the bottom unit 10 side, whereas the thermal head 42 and the movable blade 48 are provided on the cover 11 side. However, the present invention is not limited to this configuration. The platen roller 41 and the fixed blade 47 may be provided on the cover 11 side, whereas the thermal head 42 and the movable blade 48 may be provided on the bottom unit 10 side. As an another example, the entire printing unit 3 may be provided on any one of the bottom unit 10 and the cover 11. Further, the cutter unit 43 is not an essential component.

In the above-mentioned embodiment, description is made of the configuration in which the flap unit 61 is provided on the bottom unit 10 side, but the present invention is not limited to this configuration. The flap unit 61 may be provided on the cover 11 side so as to be pivotable. In the above-mentioned embodiment, description is made of the configuration in which the flap unit 61 pivots about the axis O2 along the center axis of the roll sheet R, but the present invention is not limited to this configuration. The flap unit 61 may pivot about an axis along the up-and-down direction. In the above-mentioned embodiment, description is made of the configuration in which the flap roller 61*c* is provided at the distal end portion of the flap 61*a*, but the flap roller 61*c* may be provided at a portion other than the distal end portion of the flap 61*a*. In this case, a plurality of flap rollers 61*c* may be provided. However, the flap roller 61*c* is not an essential component.

In the above-mentioned embodiment, description is made of the configuration in which the sheet retaining mechanism 5 includes the first guide roller 63 and the second guide roller 64, but the present invention is not limited to this configuration. The sheet retaining mechanism 5 may include only any one of the first guide roller 63 and the second guide roller 64, or may include three or more rollers.

In addition, without departing from the gist of the present invention, the components in the above-mentioned embodiment may be replaced with well-known components as appropriate. Further, the modification examples described above may be combined as appropriate.

What is claimed is:

1. A thermal printer, comprising:
- a casing including:
  - a cover;
  - a bottom unit including:
    - a roll sheet receiving portion that allows a roll sheet, which is obtained by winding a recording sheet, to be loaded into the roll sheet receiving portion; and
    - a delivery slot through which a portion of the recording sheet drawn from the roll sheet is delivered to an outside of the thermal printer;
- a printing unit including:
  - a thermal head provided in a space of the casing between the roll sheet receiving portion and the delivery slot, and configured to perform printing on the recording sheet; and
  - a platen roller configured to convey the recording sheet toward the delivery slot while sandwiching the recording sheet between the thermal head and the platen roller;

wherein the bottom unit further includes:

a flap provided on a portion of the bottom unit between the printing unit and the roll sheet receiving portion so as to be pivotable about a first axis, and configured to press the roll sheet in a direction of separating away from the delivery slot through abutment against an outer peripheral surface of the roll sheet; and an urging member configured to urge the flap about the first axis in the direction of separating away from the delivery slot.

2. The thermal printer according to claim 1, further comprising a flap roller provided at a distal end portion of the flap, and configured so as to be rotatable about a second axis along a center axis of the roll sheet, and allowed to be brought into abutment against the recording sheet.

3. The thermal printer according to claim 1, further comprising a first guide roller and a second guide roller provided on a portion of the casing located closer to the roll sheet receiving portion than the printing unit, the first guide roller being rotatable about a third axis along the center axis of the roll sheet, the second guide roller being rotatable about a fourth axis along the third axis, and wherein the recording sheet is led to the printing unit through a space between the first guide roller and the second guide roller.

4. The thermal printer according to claim 3, wherein the first guide roller is arranged closer to the roll sheet receiving portion than the second guide roller, and wherein the first guide roller is made of a material softer than a material for the second guide roller.

5. The thermal printer according to claim 1, further comprising a sensor provided on the casing, and configured to detect a remaining amount of the roll sheet, wherein the sensor includes a lever that is connected to the flap, and is pivotable between an ON position and an OFF position along with pivoting of the flap.

6. The thermal printer according to claim 1, further comprising a positioning mechanism provided on the casing so as to be movable in a first direction along the center axis of the roll sheet, and configured to position the roll sheet in the roll sheet receiving portion in the first direction through abutment against the roll sheet from both sides in the first direction.

7. The thermal printer according to claim 6, wherein the printing unit includes:

a fixed blade provided on one side with respect to the delivery slot; and a movable blade that is provided on another side with respect to the delivery slot so as to be allowed to come close to and separate away from the fixed blade, and is capable of cutting the recording sheet between the fixed blade and the movable blade, and wherein, in a center portion of the movable blade in the first direction, a recessed portion is formed to be recessed from a blade edge of the movable blade.

* * * * *